(12) United States Patent
Griffin et al.

(10) Patent No.: US 11,144,334 B2
(45) Date of Patent: Oct. 12, 2021

(54) QUANTUM COMPUTER TASK MANAGER

(71) Applicant: Red Hat, Inc., Raleigh, NC (US)

(72) Inventors: Leigh Griffin, Waterford City (IE);
Luigi M. Zuccarelli, Waterford City (IE)

(73) Assignee: Red Hat, Inc., Raleigh, NC (US)

( * ) Notice: Subject to any disclaimer, the term of this patent is extended or adjusted under 35 U.S.C. 154(b) by 476 days.

(21) Appl. No.: 16/227,747

(22) Filed: Dec. 20, 2018

(65) Prior Publication Data

US 2020/0201655 A1    Jun. 25, 2020

(51) Int. Cl.
*G06N 10/00* (2019.01)
*G06F 9/448* (2018.01)

(52) U.S. Cl.
CPC .......... *G06F 9/4494* (2018.02); *G06N 10/00* (2019.01)

(58) Field of Classification Search
CPC .................................................... G06N 10/00
See application file for complete search history.

(56) References Cited

U.S. PATENT DOCUMENTS

| | | | |
|---|---|---|---|
| 7,451,292 B2 | 11/2008 | Routt | |
| 7,639,035 B2 | 12/2009 | Berkley | |
| 7,853,011 B2 | 12/2010 | Kuang et al. | |
| 8,102,185 B2 | 1/2012 | Johansson et al. | |
| 8,434,027 B2 | 4/2013 | Jones | |
| 8,600,051 B2 | 12/2013 | Noh | |
| 8,959,115 B2 | 2/2015 | Marathe | |
| 9,195,980 B2 | 11/2015 | Puura et al. | |
| 9,264,226 B2 | 2/2016 | Harrison et al. | |
| 9,495,644 B2 | 11/2016 | Chudak et al. | |
| 9,509,506 B2 | 11/2016 | Hughes et al. | |
| 9,774,401 B1 | 9/2017 | Borrill | |
| 9,847,913 B2 | 12/2017 | Kanda et al. | |
| 9,887,976 B2 | 2/2018 | Hughes et al. | |
| 10,331,658 B2 | 6/2019 | Pennefather et al. | |
| 10,592,216 B1 | 3/2020 | Richardson et al. | |

(Continued)

FOREIGN PATENT DOCUMENTS

| CN | 104022947 A | 9/2014 |
|---|---|---|
| CN | 105164704 B | 7/2018 |

(Continued)

OTHER PUBLICATIONS

Gühne, O., et al., "Entanglement detection," Physics Reports, vol. 474, No. 1, Feb. 27, 2009, 90 pages.

(Continued)

*Primary Examiner* — Matthew L Reames
(74) *Attorney, Agent, or Firm* — Withrow & Terranova, PLLC (57) ABSTRACT

A quantum computer task manager is provided. The quantum computer task manager executes on a quantum computing system that utilizes a plurality of qubits. The quantum computer task manager accesses first data associated with a first quantum service to determine a first subset of qubits used by the first quantum service. For at least one qubit of the first subset of qubits, the quantum computer task manager determines either a superposition status or an entanglement status of the at least one qubit, and communicates to a destination information that identifies the first quantum service, the at least one qubit, and either the superposition status of the at least one qubit or the entanglement status of the at least one qubit.

20 Claims, 7 Drawing Sheets

(56) References Cited

U.S. PATENT DOCUMENTS

| | | |
|---|---|---|
| 2003/0121028 A1 | 6/2003 | Coury et al. |
| 2012/0093521 A1 | 4/2012 | Harrison et al. |
| 2016/0071021 A1 | 3/2016 | Raymond |
| 2017/0272174 A1 | 9/2017 | Brandenburger et al. |
| 2017/0351974 A1 | 12/2017 | Rose et al. |
| 2018/0091440 A1 | 3/2018 | Dadashikelayeh et al. |
| 2018/0144262 A1 | 5/2018 | Roetteler et al. |
| 2018/0365585 A1 | 12/2018 | Smith et al. |
| 2020/0074346 A1 | 3/2020 | Griffin et al. |

FOREIGN PATENT DOCUMENTS

| | | |
|---|---|---|
| CN | 109816112 A | 5/2019 |
| JP | 6465876 B2 | 2/2019 |
| WO | 2016206498 A1 | 12/2016 |
| WO | 2017127850 A1 | 7/2017 |
| WO | 2018111242 A1 | 6/2018 |

OTHER PUBLICATIONS

Mina, M., et al., "EntangleNet: Theoretical Reestablishment of Entanglement in Quantum Networks," Applied Science, vol. 8, Issue 10, Oct. 16, 2018, 17 pages.

Pathumsoot, P., et al., "Modeling of Measurement-based Quantum Network Coding on IBM Q Experience Devices," arXiv: 1910.00815v2 [quant-ph], Nov. 12, 2019, 10 pages.

Schoute, E., et al., "Shortcuts to Quantum Network Routing," Jul. 9, 2016, available online at https://obj.umiacs.umd.edu/extended_abstracts/QCrypt_2016_paper_203.pdf, 2 pages.

Yang, C., et al., "Entanglement generation and quantum information transfer between spatiallY-separated qubits in different cavities," New Journal of Physics, vol. 15, Nov. 1, 2013, 19 pages.

Author Unknown, "Hash Based Quantum Key Two Server Password Authentication," Chapter 5, Published at least as early as Jul. 12, 2018, 19 pages.

Chong, Frederic, et al., "Programming languages and compiler design for realistic quantum hardware," Nature, vol. 549, Sep. 14, 2017, Macmillan Publishers Limited, 8 pages.

Kollmitzer, Christian, et al., "Applied Quantum Cryptography," Lecture Notes in Physics 797, 2010, Springer-Verlag Berlin Heidelberg, 227 pages.

Lee, Chris, "New form of qubit control may yield longer computation times," Ars Technica, Jan. 26, 2018, Wired Media Group, 5 pages.

Trung, Truong, "Quantum Information System and the Security of Communication," Apr. 2014, pp. 115-121.

Barnum, H. et al., "Authentication of Quantum Messages," Proceedings of the 43rd Annual IEEE Symposium on Foundations of Computer Science, Nov. 2002, IEEE, 10 pages.

Bushwick, S., "New Encryption System Protects Data from Quantum Computers," Scientific American, Oct. 8, 2019, https://www.scientificamerican.com/article/new-encryption-system-protects-data-from-quantum-computers/, 5 pages.

Chen, S., "What if Quantum Computers Used Hard Drives made of DNA?" Wired, Mar. 15, 2017, https://www.wired.com/2017/03/quantum-computers-used-hard-drives-made-dna/, 10 pages.

Choi, C., "A Data Bus for Quantum Computers," IEEE Spectrum, Nov. 9, 2017, https://spectrum.ieee.org/tech-talk/computing/hardware/a-quantum-bus-for-quantum-computers, 3 pages.

Sillanpaa, M. et al., "Coherent quantum state storage and transfer between two phase qubits via a resonant cavity," Nature, vol. 449, Sep. 2007, Nature Publishing Group, pp. 438-442.

Toyoizumi, H., "Performance Evaluation of Quantum Merging: Negative Queue Length," Waseda University, accessed Apr. 2020 from http://www.f.waseda.jp/toyoizumi/research/papers/Performance%20Evaluation%20of%20Quantum%20Merging%20Negative.pdf, 5 pages.

Yamasaki, H. et al., "Quantum State Merging for Arbitrarily Small-Dimensional Systems," IEEE Transactions on Information Theory, vol. 65, No. 6, Jun. 2019, IEEE, pp. 3950-3972.

QUANTUM COMPUTING SYSTEM METRICS 73

| SERVICE ID | SERVICE TYPE | SUPERPOSITION | QUBIT ENTANGLEMENT | QUBITS AVAILABLE | IP ADDR | CHANNEL ID | DYNAMIC CHANNEL CAPACITY |
|---|---|---|---|---|---|---|---|
| A | QUANTUM | 0 | QBIT 1, QBIT 2 | 0, 1, 2 | 252.334.100.234 | M | 23 |
| B | CLASSICAL | N/A | N/A | N/A | 252.334.100.235 | 1 | 65 |
| C | QUANTUM | 1 | QBIT 1 | 1 | 252.334.100.236 | 1 | 65 |
| D | QUANTUM | NULL | QBIT 2 | 2, 3, 4 | 252.334.100.237 | 2 | 95 |

CURRENT COMPUTER METRICS

| | |
|---|---|
| QBIT COUNT | 10 |
| CURRENT QBIT LOAD | 50% |
| T1 (μsecs) | MIN: 39.3 | MAX: 53.0 | AVG: 46.1 |
| T2 (μsecs) | MIN: 13.1 | MAX: 38.4 | AVG: 22.4 |
| GATE ERRORS (SINCE LAST CALIBRATION: 46 HOURS) | 2% |
| MULTI-QUBIT ERRORS (SINCE LAST CALIBRATION: 46 HOURS) | 4% |
| LAST CALIBRATION | 10/14/2018 08:32:45 |
| CURRENT TEMPERATURE (mK) | 10.7 |
| TEMPERATURE CAPABILITY (mK) | 10 |

QUANTUM COMPUTER TASK MANAGER

BACKGROUND

Quantum computing involves the use of quantum bits, referred to herein as qubits, which have characteristics that differ from those of classical bits used in classical computing. A classical bit has a state of 1 or 0. In contrast, a qubit may have a combination of different states, referred to as a superposition state. Two qubits may experience a physical phenomenon referred to as entanglement where the states of the two qubits are tied together. Classical computing has no corollaries to superposition and entanglement.

SUMMARY

The examples disclosed herein relate to a quantum computer task manager that is configured to maintain, and collect, data regarding the quantum computing system and/or the quantum services that can be implemented on the quantum computing system, and provide such data upon request to other tasks executing on the quantum computing system.

In one example a method is provided. The method includes accessing, by a quantum computer task manager executing on a quantum computing system that utilizes a plurality of qubits, first data associated with a first quantum service to determine a first subset of qubits used by the first quantum service. The method further includes, for at least one qubit of the first subset of qubits, determining either a superposition status or an entanglement status of the at least one qubit, and communicating, to a destination, information that identifies the first quantum service, the at least one qubit, and either the superposition status of the at least one qubit or the entanglement status of the at least one qubit.

In another example a quantum computing system that implements a plurality of qubits is provided. The quantum computing system includes one or more memories and includes one or more processor devices coupled to the one or more memories. The one or more processor devices are to access, by a quantum computer task manager, first data associated with a first quantum service to determine a first subset of qubits used by the first quantum service. The one or more processor devices are further to, for at least one qubit of the first subset of qubits, determine either a superposition status or an entanglement status of the at least one qubit, and communicate, to a destination, information that identifies the first quantum service, the at least one qubit, and either the superposition status of the at least one qubit or the entanglement status of the at least one qubit.

In another example a computer program product is provided. The computer program product is stored on a non-transitory computer-readable storage medium and includes instructions to cause one or more processor devices, on a quantum computer that implements a plurality of qubits, to access, by a quantum computer task manager, first data associated with a first quantum service to determine a first subset of qubits used by the first quantum service. The instructions further cause the one or more processor devices to, for at least one qubit of the first subset of qubits, determine either a superposition status or an entanglement status of the at least one qubit, and communicate, to a destination, information that identifies the first quantum service, the at least one qubit, and either the superposition status of the at least one qubit or the entanglement status of the at least one qubit.

Individuals will appreciate the scope of the disclosure and realize additional aspects thereof after reading the following detailed description of the examples in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

DETAILED DESCRIPTION

The examples set forth below represent the information to enable individuals to practice the examples and illustrate the best mode of practicing the examples. Upon reading the following description in light of the accompanying drawing figures, individuals will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the examples are not limited to any particular sequence of steps. The use herein of ordinals in conjunction with an element is solely for distinguishing what might otherwise be similar or identical labels, such as "first message" and "second message," and does not imply a priority, a type, an importance, or other attribute, unless otherwise stated herein. The term "about" used herein in conjunction with a numeric value means any value that is within a range of ten percent greater than or ten percent less than the numeric value. As used herein and in the claims, the articles "a" and "an" in reference to an element refers to "one or more" of the element unless otherwise explicitly specified. The word "or" as used herein and in the claims is inclusive unless contextually impossible. As an example, the recitation of A or B means A, or B, or both A and B.

Quantum computing involves the use of quantum bits, referred to herein as qubits, which have characteristics that differ from those of classical bits used in classical computing. A classical bit has a state of 1 or 0. In contrast, a qubit may have a combination of different states, referred to as a superposition state. Two qubits may experience a physical phenomenon referred to as entanglement where the states of the two qubits are tied together. Classical computing has no corollaries to superposition and entanglement.

Process managers, such as a task manager, in classical computing systems are useful to derive the current state of actively running services within a computing system. The process manager may be used to determine the capability of a computing system, diagnose problems, and/or provide metadata-rich information about running processes.

In quantum computing systems, quantum services include quantum-related metadata that does not exist in classical computing systems. Such quantum-related metadata may include, for example, physical phenomena such as superposition and entanglement, and which qubits are utilized by which quantum services. Such information may be desirable to an operator of the quantum computing system, and to other running tasks on the quantum computing system, such as a scheduler, or the like.

The examples herein relate to a quantum computer task manager that is configured to maintain, and collect, data regarding the quantum computing system and/or the quantum services that can be implemented on the quantum computing system. The quantum computer task manager executes on a quantum computing system that utilizes qubits and, in response to a request, accesses data associated with quantum services that are implementable on the quantum computing system. The data may include, for example, data regarding the qubits by used the quantum service, and physical phenomena associated with such qubits, such as the superposition and entanglement statuses of the qubits. The quantum computer task manager can provide such information to a requesting task, such as a quantum scheduler task, or an operations management task. Thus, the data may be used by other tasks executing on the quantum computing system to make decisions on future actions, such as whether or not to initiate an additional task, or the like, or to monitor and/or diagnose the quantum computing system.

Figure 1:
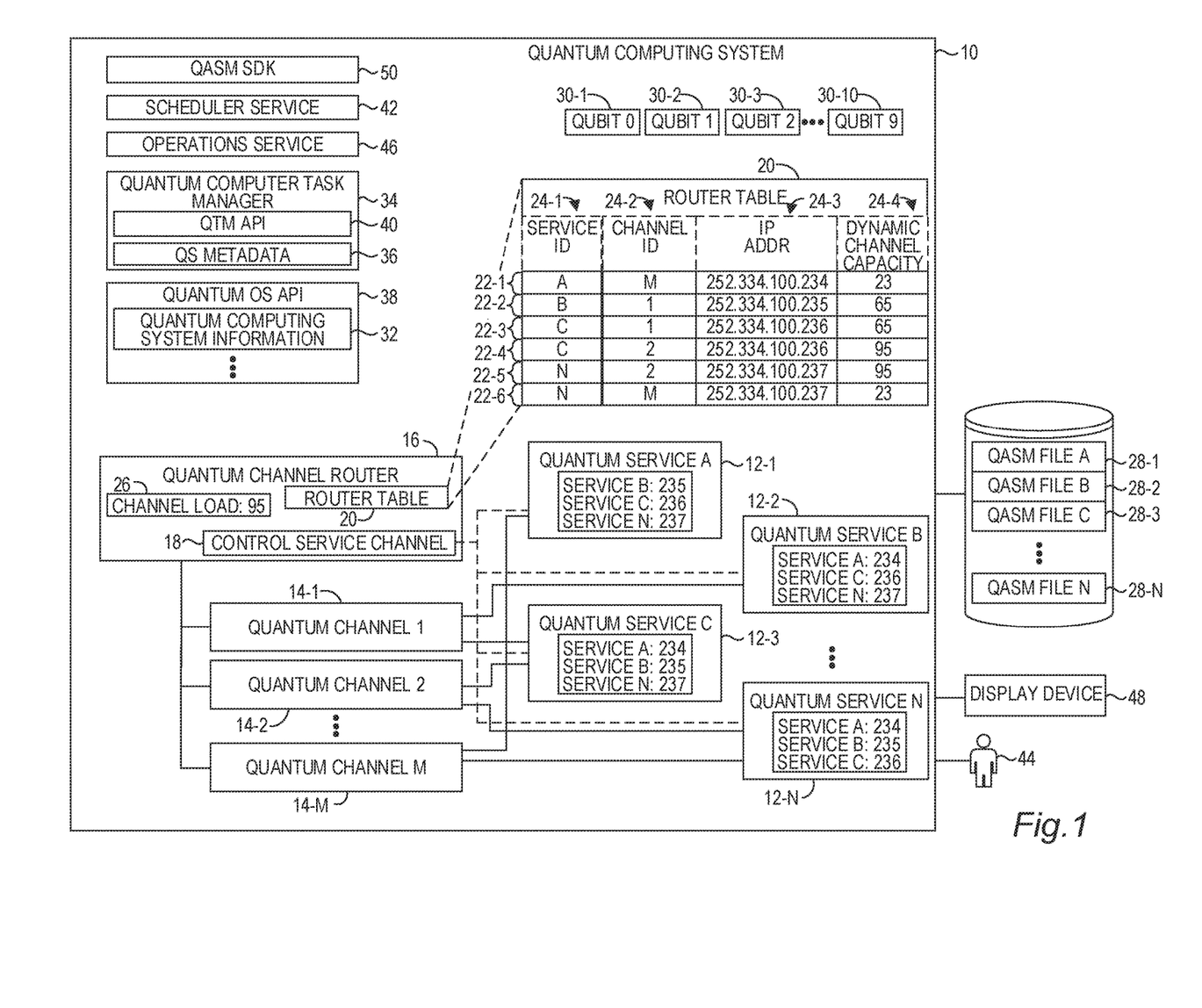
FIG. 1 is a block diagram of a quantum computing system in which examples may be practiced.

FIG. 1 is a block diagram of a quantum computing system 10 in which examples may be practiced. The quantum computing system 10 operates in a quantum environment but can operate using classical computing principles or quantum computing principles. When using quantum computing principles, the quantum computing system 10 performs computations that utilize quantum-mechanical phenomena, such as superposition and entanglement. The quantum computing system 10 may operate under certain environmental conditions, such as at or near 0° Kelvin. When using classical computing principles, the quantum computing system 10 utilizes binary digits that have a value of either 1 or 0.

The quantum computing system 10 includes a plurality of quantum services 12-1, 12-2, 12-3, and 12-N (generally, quantum services 12). While for purposes of illustration only four quantum services 12 are illustrated, the examples are not limited to any particular number of quantum services 12, and in practice, the quantum computing system 10 may have tens, hundreds or even thousands of quantum services 12. Each of the quantum services 12 is coupled to one or more quantum channels 14-1, 14-2, and 14-M (generally, quantum channels 14). The quantum channels 14 may be communicatively coupled to a quantum channel router 16.

In some examples the quantum channel router 16 includes, or is communicatively coupled to, a control service channel 18 on which service identifiers may be advertised by each quantum service 12, such that each quantum service 12 is aware of each other quantum service 12. Thus, the quantum services 12 are also communicatively coupled to the control service channel 18.

In some examples the quantum channel router 16 maintains a router table 20 that stores data associated with the quantum services 12. The data in the router table 20 includes information that describes a current state of the quantum services 12, maintained, in this example, in a plurality of rows 22-1-22-6. The rows 22-1-22-6 may be generally referred to herein as rows 22. Each row 22 contains four data fields, illustrated in columns 24-1-24-4 of the router table 20. The data in column 24-1 identifies the particular quantum service 12 that is associated with that row 22. The data in column 24-2 identifies a particular quantum channel 14 that is associated with that row 22. The data in column 24-3 identifies the destination quantum service identifier associated with the particular quantum service 12 associated with that row 22. The data in column 24-4 identifies a current channel capacity of the quantum channel 14 to which the quantum service 12 associated with that row 22 listens.

As an example, with regard to the row 22-1, the data in column 24-1 indicates that the row 22-1 is associated with the quantum service 12-1. The data in column 24-2 indicates that the quantum service 12-1 is listening to the quantum channel 14-M. The data in column 24-3 indicates that the quantum service 12-1 has a destination quantum service identifier of 252.334.100.234. The data in column 24-4 indicates that a current channel capacity of the quantum channel 14-M is 23%.

As one more example, with regard to the row 22-2, the data in column 24-1 indicates that the row 22-2 is associated with the quantum service 12-2, and the data in column 24-2 indicates that the quantum service 12-2 is listening to the quantum channel 14-1. The data in column 24-3 indicates that the quantum service 12-2 has a destination quantum service identifier of 252.334.100.235. The data in column 24-4 indicates that a current channel capacity of the quantum channel 14-1 is 65%.

Upon receipt of a message, the quantum channel router 16 accesses the router table 20 to determine the quantum channel 14 associated with the quantum service 12 identified by the destination quantum service identifier in the message. Assume, as an example, that the destination quantum service identifier in the received message identifies the quantum service 12-3. The quantum channel router 16 determines that the rows 22-3 and 22-4 of the router table 20 are associated with the quantum service 12-3 based on the data in column 24-1. The row 22-3 indicates that the quantum service 12-3 is listening to the quantum channel 14-1. The row 22-4 indicates that the quantum service 12-3 is also listening to the quantum channel 14-2.

The quantum channel router 16 accesses a threshold channel load 26 that identifies a maximum channel capacity of a quantum channel 14. With regard to the quantum channel 14-2, the quantum channel router 16 accesses the channel capacity data in the column 24-4 of the row 22-4 and determines that the channel capacity is equal to the threshold channel load 26, in this example, 95, and thus that at the current point in time the quantum channel 14-2 is at maximum capacity and cannot process additional messages. The quantum channel router 16 accesses the channel capacity data in the column 24-4 of the row 22-3, and determines that the channel capacity, in this example 65, is below the threshold channel load 26. The quantum channel router 16 sends the message to the quantum service 12-3 via the quantum channel 14-1.

The quantum services 12 are running tasks whose functionality is defined and implemented by programming instructions in corresponding quantum assembly (QASM) files 28-1-28-N (generally, QASM files 28). For example, the QASM file 28-1 contains quantum instructions that implement the quantum service 12-1; the QASM file 28-2 contains quantum instructions that implement the quantum service 12-2; the QASM file 28-3 contains quantum instructions that implement the quantum service 12-3; and the QASM file 28-N contains quantum instructions that implement the quantum service 12-N.

In operation, the quantum services 12 may utilize one or more quantum bits (qubits) 30-1-30-10 (generally, qubits 30) that are maintained by the quantum computing system 10. Based on instructions in the QASM files 28, one or more of the qubits 30 may be in a state of superposition, and/or a state of entanglement with one or more other qubits 30.

The quantum computing system 10 maintains quantum computing system information 32 that includes, by way of non-limiting example, the number of qubits 30 used by the quantum computing system 10, a current temperature of the quantum computing system 10, coherence information, gate error information, and the like. The quantum computing system information 32 will be discussed in greater detail with reference to FIG. 3, below.

The quantum computing system 10 includes a quantum computer task manager 34 that maintains quantum system metadata 36 regarding a current state of the qubits 30, and that can access other information, such as information contained in the router table 20 and the quantum computing system information 32, to provide a consolidated source of information regarding the quantum computing system 10. The quantum system metadata 36 may include, by way of non-limiting example, information that identifies the particular qubits 30 used by each quantum service 12, and the superposition and entanglement statuses of the qubits 30. The quantum computer task manager 34 can query the quantum channel router 16 for the router table 20 periodically, or in response to a request from another task for information about the quantum computing system 10. In some implementations, the quantum computer task manager 34 may actually maintain the information in the router table 20, and the quantum channel router 16 may query the quantum computer task manager 34 as needed to route messages to and from the quantum services 12.

In some implementations, the quantum computer task manager 34 may obtain access to the quantum computing system information 32 via a quantum operating system application programming interface (API) 38. Other tasks or processes running on the quantum computing system 10 may query the quantum computer task manager 34 for information via a quantum computer task manager API 40. The quantum computer task manager API 40 may offer one or more entrypoints that allow another task to request specific information regarding the qubits 30, or the quantum services 12, or the quantum computing system information 32. The quantum computer task manager API 40 may also offer entrypoints that allow cumulative information to be obtained, such as all information obtainable by the quantum computer task manager 34 regarding the qubits 30, the quantum services 12, and the quantum computing system information 32.

One such task may be a scheduler service 42 that is responsible for executing tasks, such as the quantum services 12, on the quantum computing system 10. Prior to executing a task, the scheduler service 42 may call the quantum computer task manager API 40 to obtain information regarding the qubits 30 from the quantum system metadata 36, information regarding the router table 20, and/or information about the quantum computing system 10 contained in the quantum computing system information 32. In response to the request, the quantum computer task manager 34 accesses the appropriate information from the quantum system metadata 36, the router table 20, and/or the quantum computing system information 32, and provides the requested information to the scheduler service 42 for use in scheduling tasks, such as the quantum services 12.

In some implementations, an operator 44 may interact with an operations service 46 to diagnose problems or otherwise monitor the quantum computing system 10. In response to a request from the operator 44, the operations service 46 invokes the quantum computer task manager API 40 to obtain data from the quantum computer task manager 34 regarding the quantum computing system 10. The quantum computer task manager 34, in response to the request, accesses the appropriate information from the quantum system metadata 36, the router table 20, and/or the quantum computing system information 32, and provides the requested information to the operations service 46. The operations service 46 receives the information from the quantum computer task manager 34, formats the data if necessary, and presents the information to the operator 44 via a display device 48. While for purposes of illustration the quantum computer task manager 34 and the operations service 46 are shown as separate components, it will be appreciated that in other implementations, the functionality provided by the operations service 46 could be implemented directly in the quantum computer task manager 34.

In some implementations, as will be discussed in greater detail in conjunction with FIG. 2 below, the quantum computer task manager 34 accesses information contained in the QASM files 28 to determine the quantum system metadata 36. Generally, the quantum computer task manager 34 may analyze the QASM files 28 to, for example, determine if the QASM file 28, when executed, places one or more of the qubits 30 in a state of superposition or a state of entanglement. The quantum computer task manager 34 may also analyze the QASM files 28 to determine a subset of qubits 30 of all the available qubits 30 that are used by each quantum service 12. In some implementations, the quantum computer task manager 34 may access the QASM files 28 via a QASM software developer kit (SDK) 50 that was used to generate the QASM files 28, and thus understands the formatting and information contained in the QASM files 28. The QASM files 28 may be based on any quantum programming language.

Figure 2:
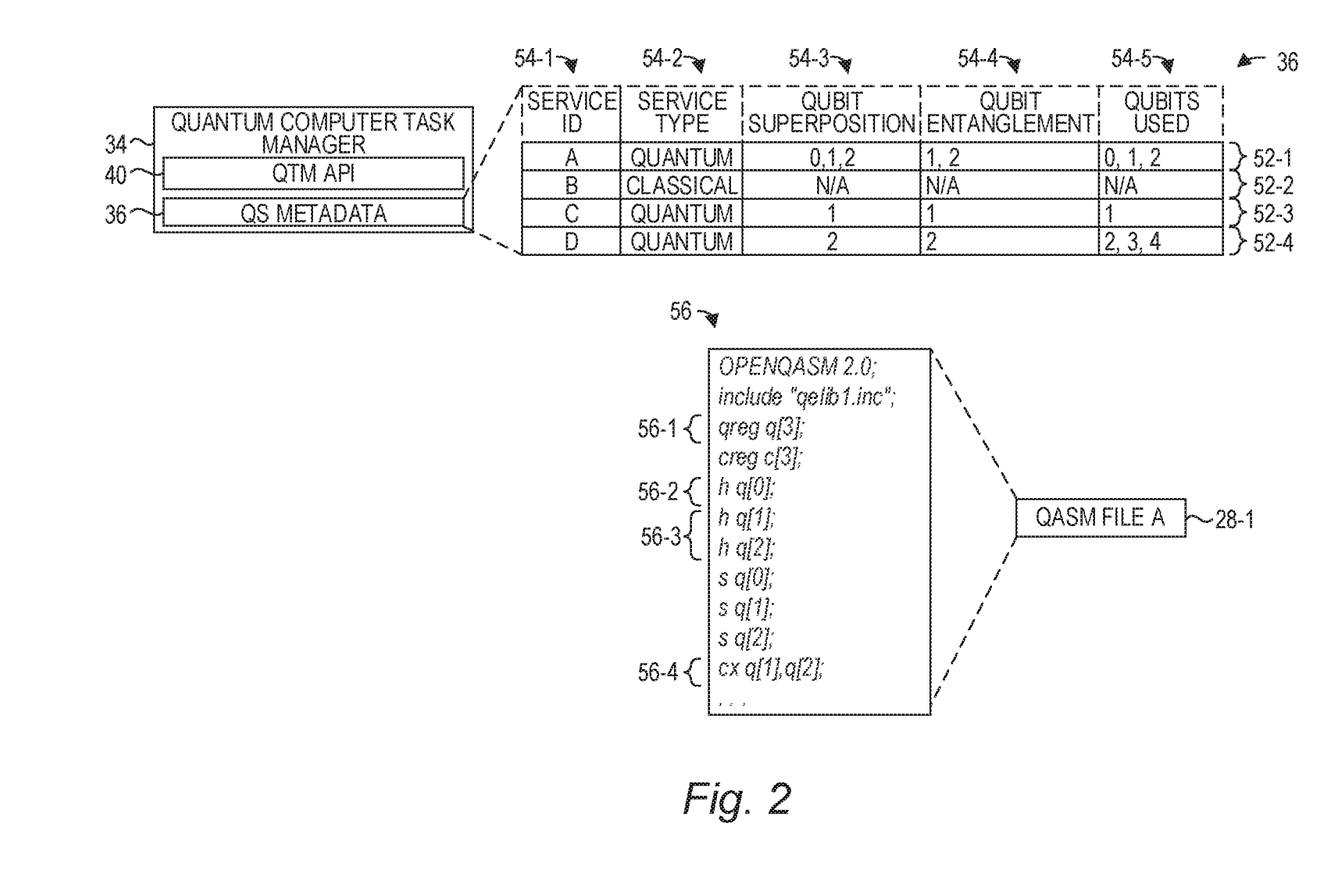
FIG. 2 is a block diagram illustrating quantum system metadata illustrated in FIG. 1 in greater detail according to one example.

FIG. 2 is a block diagram illustrating the quantum system metadata 36 according to one example. In this implementation, the quantum system metadata 36 includes rows 52-1-52-4 that each correspond to a quantum service 12 that may be implemented in the quantum computing system 10, and that contains data about the corresponding quantum service 12. In this example, the row 52-1 corresponds to the quantum service 12-1; the row 52-2 corresponds to the quantum service 12-2; the row 52-3 corresponds to the quantum service 12-3; and the row 52-4 corresponds to the quantum service 12-N.

Each row 52 includes a service ID field 54-1 that identifies the quantum service 12 that corresponds to the row 52. Each row 52 includes a service type field 54-2 that identifies the type of quantum service 12. The type may be, for example, a quantum computing type that indicates that the quantum service 12 utilizes quantum computing and may also utilize classical computing, or may be a classical computing type that indicates that the quantum service 12 utilizes only classical computing. Each row 52 includes a superposition field 54-3 that identifies those qubits 30, if any, that are in a state of superposition. Each row 52 includes an entanglement field 54-4 that identifies those qubits 30, if any, that are in a state of entanglement. Each row 52 includes a qubits field 54-5 that identifies the subset of qubits 30, if any, that are used by the corresponding quantum service 12.

The quantum computer task manager 34 may obtain some or all of the information maintained in the quantum system metadata 36 based on an analysis of the QASM files 28. As an example, the QASM file 28-1, which corresponds to the quantum service 12-1, includes a plurality of quantum instructions 56 in a quantum programming language. The quantum computer task manager 34 reads the quantum instructions 56, either directly, or indirectly through the QASM SDK 50 (FIG. 1), and analyzes the quantum instructions 56. Based on a "qreg q[3]" quantum instruction 56-1, the quantum computer task manager 34 makes a determination that the quantum service 12-1 uses three qubits 30, and populates the qubits field 54-5 of the row 52-1 with this information. Based on a "h q[0]" instruction 56-2, which utilizes the Hadamard gate, the quantum computer task manager 34 makes a determination that the qubit 30-1 is being placed into a state of superposition, and indicates this in the superposition field 54-3 of the row 52-1. Similarly, based on instructions 56-3, the quantum computer task manager 34 makes a determination that the qubits 30-2, 30-3 are also being placed into a state of superposition, and indicates this in the superposition field 54-3 of the row 52-1. Based on a "cx q[1],q[2]" instruction 56-4, which utilizes the cnot gate, the quantum computer task manager 34 makes a determination that the qubits 30-1 and 30-2 are placed into a state of entanglement, and indicates this in the entanglement field 54-4 of the row 52-1. The quantum computer task manager 34 similarly analyzes the QASM files 28-2, 28-3 and 28-N to derive the information in the quantum system metadata 36.

Figure 3:
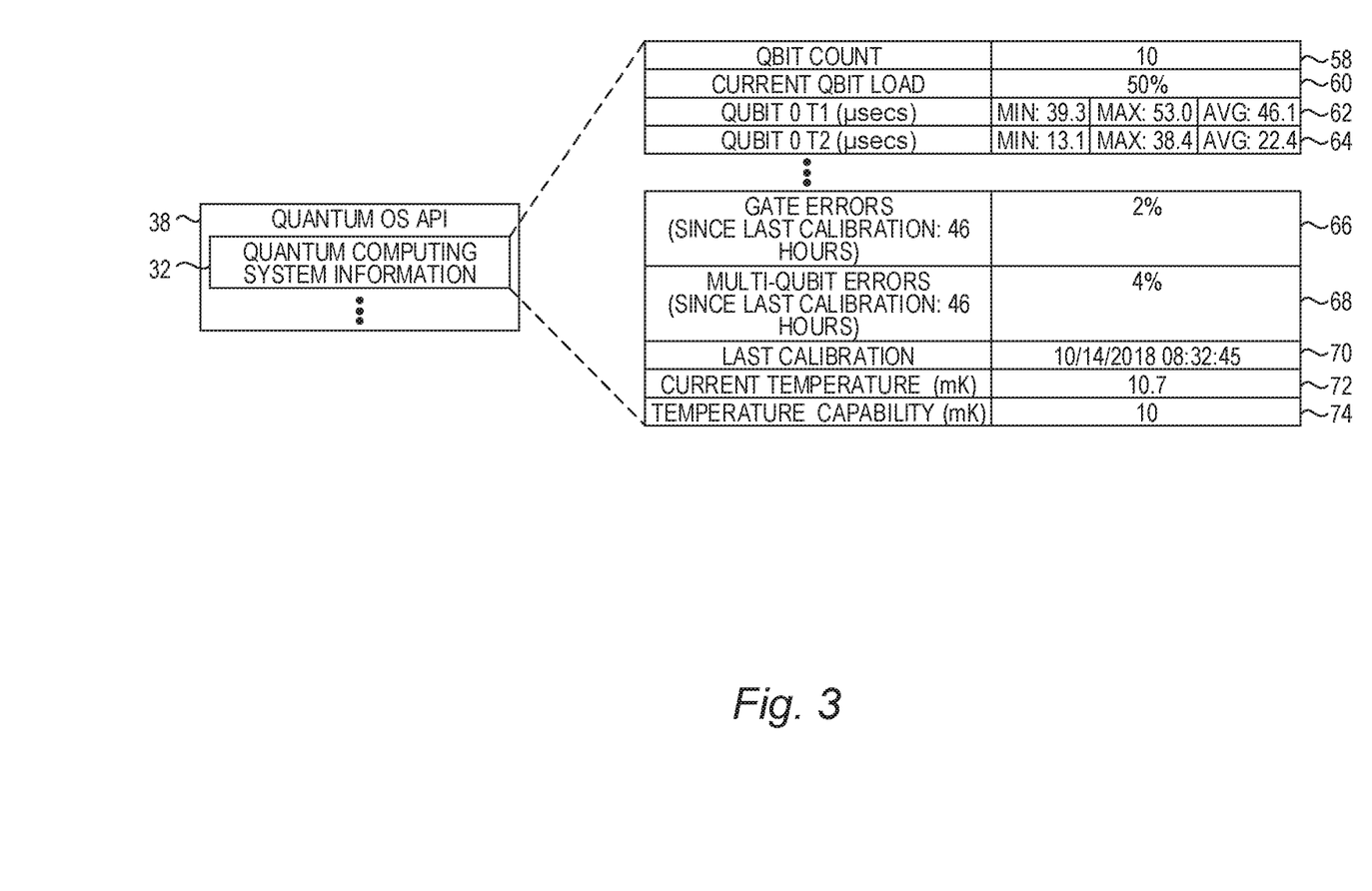
FIG. 3 is a block diagram illustrating quantum computing system information illustrated in FIG. 1 in greater detail according to one example.

FIG. 3 is a block diagram illustrating the quantum computing system information 32 illustrated in FIG. 1 in greater detail according to one example. In this example, the quantum computing system information 32 includes a qubit capacity field 58 that identifies the number of qubits 30 available on the quantum computing system 10, in this example ten qubits 30. A current qubit load field 60 identifies a percentage that identifies the number of qubits 30 that are, at the current instant in time, being used by the quantum services 12. T1 coherence fields 62 identify information relating to what is sometimes referred to as the "longitudinal coherence time," or the "spin lattice time," or the "spontaneous emission time" relating to each qubit 30. The T1 coherence fields 62 identify a measurement of the loss of energy from the quantum computing system 10, and can be determined, for example, via experimentation using known quantum computing methodologies. In this example, the T1 coherence fields 62 identify for the qubit 30-1 a minimum T1 coherence time, a maximum T1 coherence time, and an average T1 coherence time.

T2 coherence fields 64 identify information relating to what is sometimes referred to as the "transverse coherence time," or the "spinspin relaxation time," or the "phase coherence time," relating to each qubit 30. The T2 coherence fields 64 can also be determined, for example, via experimentation using known quantum computing methodologies. In this example, the T2 coherence fields 64 identify for the qubit 30-1 a minimum T2 coherence time, a maximum T2 coherence time, and an average T2 coherence time.

A gate error field 66 identifies a percentage of gate errors over a period of time, which, in this example, is the period of time since the last calibration of the quantum computing system 10. A multi-qubit errors field 68 identifies a percentage of gate errors on multiple qubits 30 over a period of time, which, in this example, is the period of time since the last calibration of the quantum computing system 10. A last calibration field 70 identifies a date and time that the quantum computing system 10 was last calibrated. A current temperature field 72 identifies a current temperature of the quantum computing system 10. An ideal temperature field 74 identifies a temperature capability of the quantum computing system 10.

Figure 4:
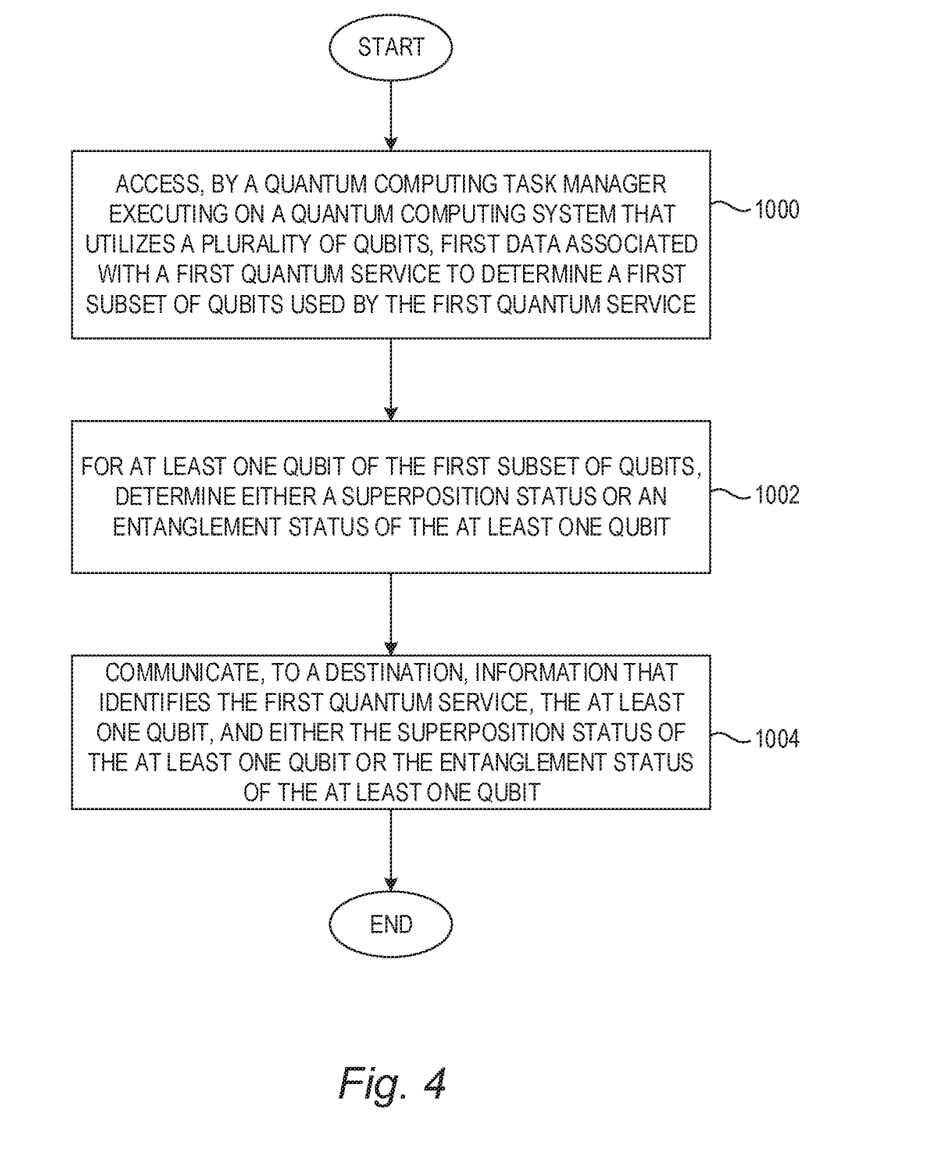
FIG. 4 is a flowchart of a method for determining the qubit usage of a quantum service according to one implementation.

FIG. 4 is a flowchart of a method for determining the qubit usage of a quantum service according to one implementation. FIG. 4 will be discussed in conjunction with FIGS. 1 and 2. The quantum computer task manager 34 executing on the quantum computing system 10 accesses data associated with the quantum service 12-1 to determine a subset of qubits 30-1, 30-2, and 30-3 used by the quantum service 12-1 (FIG. 4, block 1000). The accessed data may comprise, for example, the quantum system metadata 36, or the QASM file 28-1. For at least one qubit 30 of the subset of qubits 30-1, 30-2 and 30-3, such as the qubit 30-1, the quantum computer task manager 34 determines either a superposition status or an entanglement status of the qubit 30-1 (FIG. 4, block 1002). The quantum computer task manager 34 communicates information to a destination that identifies the quantum service 12-1, the qubit 30-1, and either the superposition status of the qubit 30-1 or the entanglement status of the qubit 30-1 (FIG. 4, block 1004). The destination, for example, may comprise a task, such as the scheduler service 42 or the operations service 46, or may comprise the display device 48.

Figure 5:
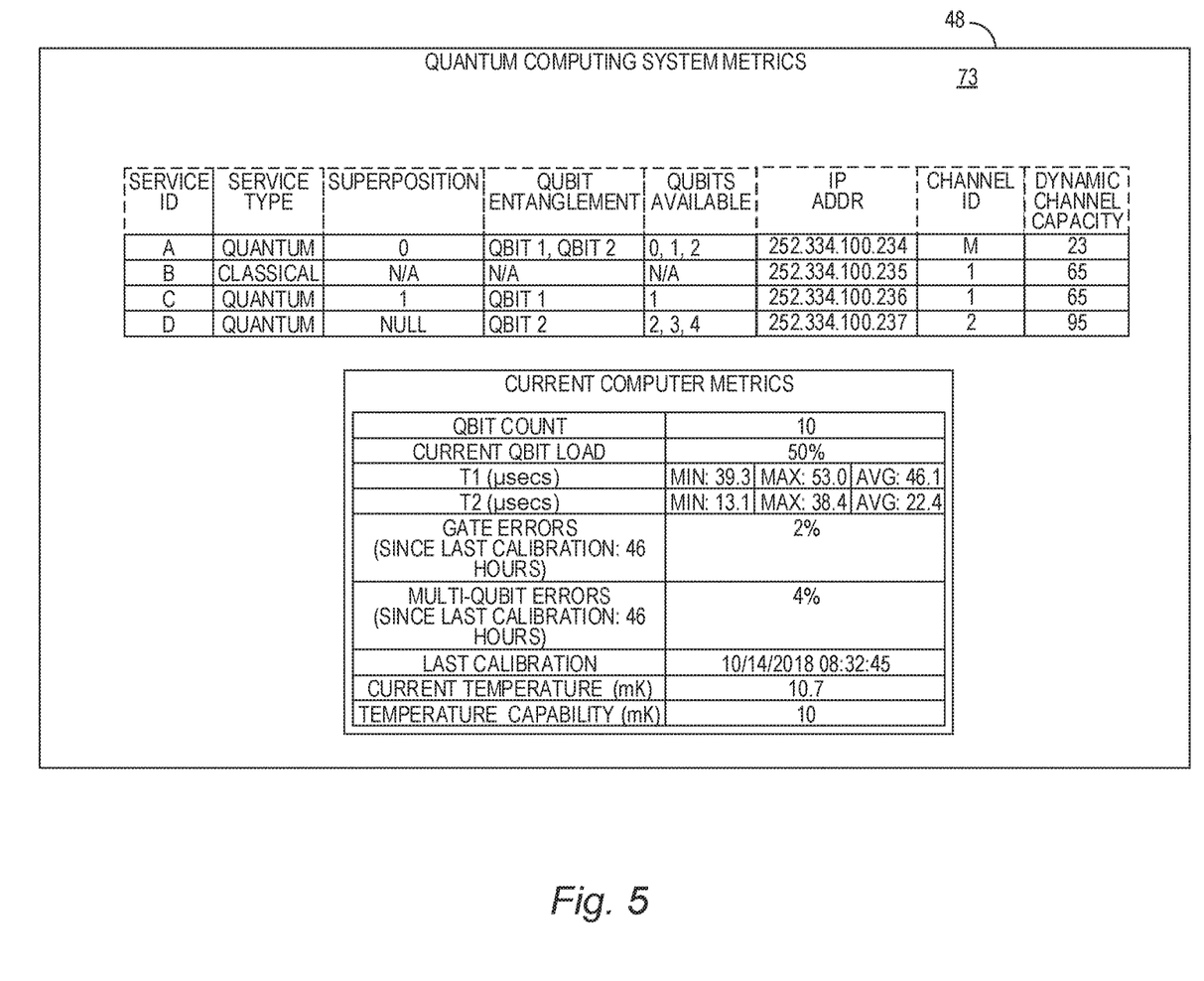
FIG. 5 is a block diagram illustrating quantum system information that may be provided by a quantum computer task manager to a requestor in accordance with one implementation.

FIG. 5 is a block diagram illustrating quantum system information that may be provided by the quantum computer task manager 34 to a requestor in accordance with one implementation. In this example, the operations service 46, in response to input from the operator 44, requests available quantum system information from the quantum computer task manager 34 via the quantum computer task manager API 40. In response to the request, the quantum computer task manager 34 accesses the quantum system metadata 36, obtains the router table 20 from the quantum channel router 16, and obtains the quantum computing system information 32 via the quantum operating system API 38. The quantum computer task manager 34 then communicates the collected information to the operations service 46, which presents the information 73 on the display device 48.

Figure 6:
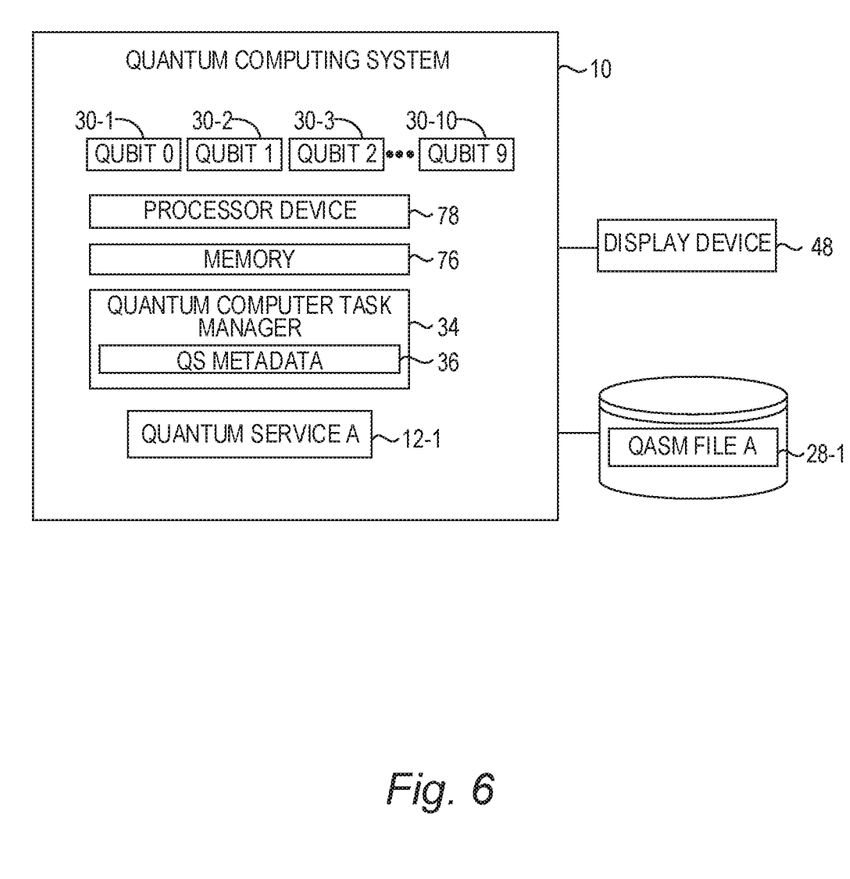
FIG. 6 is a simplified block diagram of the quantum computing system illustrated in FIG. 1 in which additional examples may be practiced.

FIG. 6 is a simplified block diagram of the quantum computing system 10 illustrated in FIG. 1, according to another example. The quantum computing system 10 includes one or more memories 76 and one or more processor devices 78 coupled to the one or more memories 76. The quantum computing system 10 may operate in a temperature controlled environment at or near 0° Kelvin. Because the quantum computer task manager 34 is a component of the quantum computing system 10, functionality implemented by the quantum computer task manager 34 may be attributed to the quantum computing system 10 generally. Moreover, in examples where the quantum computer task manager 34 comprises software instructions that program the one or more processor devices 78 to carry out functionality discussed herein, functionality implemented by the quantum computer task manager 34 may be attributed herein to the one or more processor devices 78.

In this example the one or more processor devices 78 are to access data associated with the quantum service 12-1 to determine a first subset of qubits 30 used by the quantum service 12-1. The data may comprise, for example, the QASM file 28-1 initially, and subsequently may comprise the quantum system metadata 36. For at least one qubit 30 of the first subset of qubits 30, the one or more processor devices 78 determine either a superposition status or an entanglement status of the at least one qubit 30, and communicate, to a destination, information that identifies the quantum service 12-1, the at least one qubit 30, and either the superposition status of the at least one qubit 30 or the entanglement status of the at least one qubit 30. The destination may comprise, for example, another task executing on the quantum computing system, or the display device 48 for presentation to a user.

Figure 7:
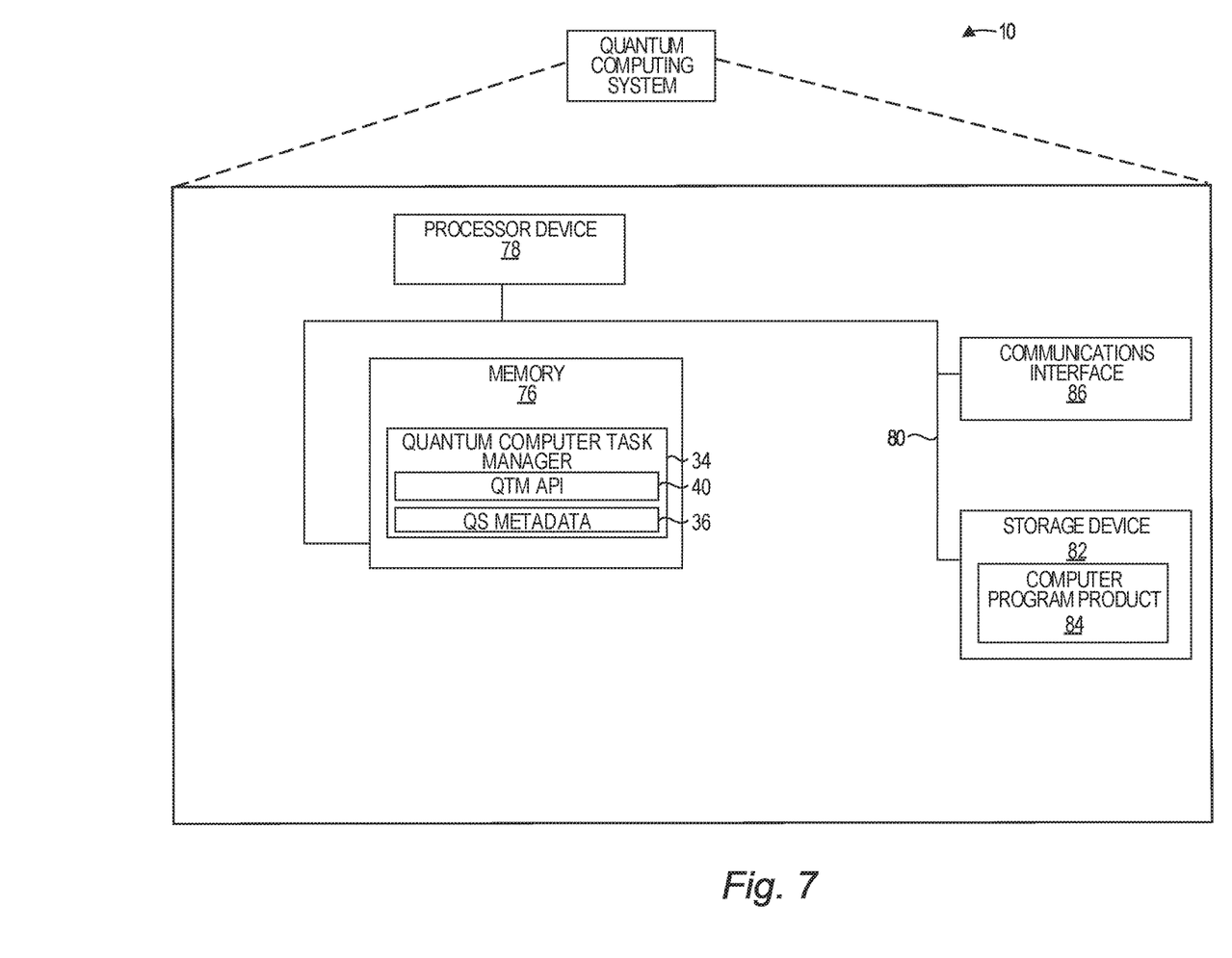
FIG. 7 is a block diagram of the quantum computing system suitable for implementing examples according to one example.

FIG. 7 is a block diagram of the quantum computing system 10 suitable for implementing examples according to one example. The quantum computing system 10 may comprise any computing or electronic device capable of including firmware, hardware, and/or executing software instructions to implement the functionality described herein in a quantum environment. The quantum computing system 10 includes the one or more processor devices 78, the one or more memories 76, and a system bus 80. The system bus 80 provides an interface for system components including, but not limited to, the one or more memories 76 and the one or more processor devices 78. The processor devices 78 can be any commercially available or proprietary processor suitable for operating in a quantum environment. The quantum computing system 10 may further include or be coupled to a non-transitory computer-readable storage medium such as a storage device 82. The storage device 82 and other drives associated with computer-readable media and computer-usable media may provide non-volatile storage of data, data structures, computer-executable instructions, and the like.

A number of modules can be stored in the storage device 82 and in the memory 76, including the quantum computer task manager 34. All or a portion of the examples may be implemented as a computer program product 84 stored on a transitory or non-transitory computer-usable or computer-readable storage medium, such as the storage device 82, which includes complex programming instructions, such as complex computer-readable program code, to cause the one or more processor devices 78 to carry out the steps described herein. Thus, the computer-readable program code can comprise software instructions for implementing the functionality of the examples described herein when executed on the one or more processor devices 78.

An operator, such as the operator 44, may also be able to enter one or more configuration commands through a keyboard (not illustrated), a pointing device such as a mouse (not illustrated), or a touch-sensitive surface. The quantum computing system 10 may also include a communications interface 86 suitable for communicating with other computing devices, including, in some implementations, classical computing devices.

Individuals will recognize improvements and modifications to the preferred examples of the disclosure. All such improvements and modifications are considered within the scope of the concepts disclosed herein and the claims that follow.

What is claimed is:

1. A method comprising:
accessing, by a quantum computer task manager executing on a quantum computing system that utilizes a plurality of qubits, first data associated with a first quantum service to determine a first subset of qubits used by the first quantum service;
for at least one qubit of the first subset of qubits, determining either a superposition status or an entanglement status of the at least one qubit; and
communicating, to a destination, information that identifies the first quantum service, the at least one qubit, and either the superposition status of the at least one qubit or the entanglement status of the at least one qubit.

2. The method of claim 1 wherein the first data comprises a quantum assembly language (QASM) file containing quantum instructions that implement the first quantum service, and further comprising analyzing the QASM file to identify the first subset of qubits.

3. The method of claim 2 further comprising analyzing, by the quantum computer task manager, the QASM file to determine the superposition status of the at least one qubit.

4. The method of claim 3 further comprising analyzing, by the quantum computer task manager, the QASM file to determine the entanglement status of the at least one qubit.

5. The method of claim 1 further comprising:
receiving, from a task, a request for data associated with each quantum service of a plurality of quantum services;
accessing, for each quantum service of the plurality of quantum services, a corresponding QASM file that contains quantum instructions that implement the quantum service;
determining, for each quantum service, a subset of qubits used by the quantum service; and
returning, to the task, information that identifies the plurality of quantum services and the subset of qubits used by each quantum service.

6. The method of claim 1 further comprising:
determining, by the quantum computer task manager, for each of a plurality of quantum services including the first quantum service, a corresponding subset of qubits used by the quantum service; and
communicating, to the destination, information that identifies the plurality of quantum services and the corresponding subsets of qubits.

7. The method of claim 1 further comprising:
determining, by the quantum computer task manager, a qubit count of the quantum computing system that identifies a total number of qubits available on the quantum computing system; and
presenting, on a display device, information that identifies the total number of qubits available on the quantum computing system.

8. The method of claim 1 further comprising:
determining, by the quantum computer task manager, a T1 coherence time associated with the quantum computing system and a T2 coherence time associated with the quantum computing system; and
presenting, on a display device, information that identifies the T1 coherence time and the T2 coherence time.

9. The method of claim 1 further comprising:
determining, by the quantum computer task manager, a current temperature of the quantum computing system; and
presenting, on a display device, information that identifies the current temperature.

10. The method of claim 1 further comprising:
determining, by the quantum computer task manager, for each of a plurality of quantum services including the first quantum service, a corresponding channel on which the quantum service can be provided a message; and
communicating, to the destination, information that identifies the plurality of quantum services and the corresponding channels on which each quantum service can be provided a message.

11. The method of claim 1 further comprising:
determining, by the quantum computer task manager, for each of a plurality of quantum services including the first quantum service, a corresponding subset of qubits used by the quantum service, a superposition status of each qubit in the corresponding subset of qubits, and an entanglement status of each qubit in the corresponding subset of qubits; and
communicating, to the destination, information that identifies the plurality of quantum services, the corresponding subset of qubits used by the quantum service, the superposition status of each qubit in the corresponding subset of qubits, and the entanglement status of each qubit in the corresponding subset of qubits.

12. The method of claim 11 wherein communicating, to the destination, the information comprises presenting on a display device the information that identifies the plurality of quantum services, the corresponding subset of qubits used by the quantum service, the superposition status of each qubit in the corresponding subset of qubits, and the entanglement status of each qubit in the corresponding subset of qubits.

13. A quantum computing system that implements a plurality of qubits, comprising:
one or more memories; and
one or more processor devices coupled to the one or more memories to:
access, by a quantum computer task manager, first data associated with a first quantum service to determine a first subset of qubits used by the first quantum service;
for at least one qubit of the first subset of qubits, determine either a superposition status or an entanglement status of the at least one qubit; and
communicate, to a destination, information that identifies the first quantum service, the at least one qubit, and either the superposition status of the at least one qubit or the entanglement status of the at least one qubit.

14. The quantum computing system of claim 13 wherein the first data comprises a quantum assembly language (QASM) file containing quantum instructions that implement the first quantum service, and wherein the one or more processor devices are further to analyze the QASM file to identify the first subset of qubits.

15. The quantum computing system of claim 14 wherein the one or more processor devices are further to analyze, by the quantum computer task manager, the QASM file to determine the superposition status of the at least one qubit.

16. The quantum computing system of claim 13 wherein the one or more processor devices are further to:
receive, from a task, a request for data associated with each quantum service of a plurality of quantum services;
access, for each quantum service of the plurality of quantum services, a corresponding QASM file that contains quantum instructions that implement the quantum service;
determine, for each quantum service, a subset of qubits used by the quantum service; and
return, to the task, information that identifies the plurality of quantum services and the subset of qubits used by each quantum service.

17. A computer program product stored on a non-transitory computer-readable storage medium and including instructions configured to cause one or more processor devices, on a quantum computer that implements a plurality of qubits, to:
access, by a quantum computer task manager, first data associated with a first quantum service to determine a first subset of qubits used by the first quantum service;
for at least one qubit of the first subset of qubits, determine either a superposition status or an entanglement status of the at least one qubit; and
communicate, to a destination, information that identifies the first quantum service, the at least one qubit, and either the superposition status of the at least one qubit or the entanglement status of the at least one qubit.

18. The computer program product of claim 17 wherein the first data comprises a quantum assembly language (QASM) file containing quantum instructions that implement the first quantum service, and wherein the instructions further cause the one or more processor devices to analyze the QASM file to identify the first subset of qubits.

19. The computer program product of claim 18 wherein the instructions further cause the one or more processor devices to analyze, by the quantum computer task manager, the QASM file to determine the superposition status of the at least one qubit.

20. The computer program product of claim 17 wherein the instructions further cause the one or more processor devices to:
receive, from a task, a request for data associated with each quantum service of a plurality of quantum services;
access, for each quantum service of the plurality of quantum services, a corresponding QASM file that contains quantum instructions that implement the quantum service;
determine, for each quantum service, a subset of qubits used by the quantum service; and
return, to the task, information that identifies the plurality of quantum services and the subset of qubits used by each quantum service.

* * * * *